United States Patent
Akay et al.

(10) Patent No.: US 11,274,649 B2
(45) Date of Patent: Mar. 15, 2022

(54) PRESSURE SUPPLY SYSTEM FOR A PNEUMATICALLY ACTIVATABLE AERODYNAMIC DEVICE OF A ROTOR BLADE OF A WIND TURBINE

(71) Applicant: Siemens Gamesa Renewable Energy A/S, Brande (DK)

(72) Inventors: Busra Akay, Herning (DK); Peder Bay Enevoldsen, Vejle (DK); Alejandro Gomez Gonzalez, Aarhus (DK); Bodo Richert, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 127 days.

(21) Appl. No.: 16/490,999

(22) PCT Filed: Nov. 28, 2017

(86) PCT No.: PCT/EP2017/080622
§ 371 (c)(1),
(2) Date: Sep. 4, 2019

(87) PCT Pub. No.: WO2018/162102
PCT Pub. Date: Sep. 13, 2018

(65) Prior Publication Data
US 2020/0011290 A1 Jan. 9, 2020

(30) Foreign Application Priority Data
Mar. 7, 2017 (DE) .................. 10 2017 203 684.2

(51) Int. Cl.
*F03D 1/06* (2006.01)
*F03D 7/02* (2006.01)

(52) U.S. Cl.
CPC ......... *F03D 1/0633* (2013.01); *F03D 1/0675* (2013.01); *F03D 7/0232* (2013.01);
(Continued)

(58) Field of Classification Search
CPC .... F03D 1/0633; F03D 1/0675; F03D 7/0232; F03D 7/022; F05B 2240/30;
(Continued)

(56) References Cited

U.S. PATENT DOCUMENTS

| | | |
|---|---|---|
| 3,172,620 A | 3/1965 | Darby |
| 3,881,669 A | 5/1975 | Lessen |

(Continued)

FOREIGN PATENT DOCUMENTS

| | | |
|---|---|---|
| CN | 100365271 C | 1/2008 |
| CN | 102165185 A | 8/2011 |

(Continued)

OTHER PUBLICATIONS

AMT Aviation Maintenance Technician Handbook—Airframe; U.S. Department of Transportation Federal Aviation Administration; vol. 2; FAA-H-8083-31A; 2018.

(Continued)

*Primary Examiner* — Aaron R Eastman
(74) *Attorney, Agent, or Firm* — Schmeiser, Olsen & Watts LLP

(57) ABSTRACT

A wind turbine with a rotor blade, wherein the rotor blade includes a pneumatically activatable aerodynamic device and the wind turbine includes a pressure supply system for controlling the activatable aerodynamic device is provided. The pressure supply system includes a pressurized air supply system, a pressurized air transmission system with pressure lines for transmitting the supplied pressurized air from the pressurized air supply system to the aerodynamic device, and at least one pneumatic actuator for activating the aerodynamic device.

19 Claims, 6 Drawing Sheets

(52) U.S. Cl.
 CPC ....... *F05B 2240/30* (2013.01); *F05B 2250/70* (2013.01); *F05B 2270/605* (2013.01)

(58) Field of Classification Search
 CPC ............ F05B 2250/70; F05B 2270/605; F05B 2240/3052; Y02E 7/022
 See application file for complete search history.

(56) References Cited

U.S. PATENT DOCUMENTS

| | | | |
|---|---|---|---|
| 6,139,268 | A | 10/2000 | Murawski et al. |
| 7,204,674 | B2 * | 4/2007 | Wobben ................ F03D 1/0641 416/1 |
| 7,828,523 | B2 | 11/2010 | Bonnet |
| 2004/0105752 | A1 | 6/2004 | Wooben |
| 2010/0259046 | A1 | 10/2010 | Kota et al. |
| 2011/0116927 | A1 | 5/2011 | Hancock et al. |
| 2011/0217167 | A1 | 9/2011 | Hancock et al. |
| 2011/0229320 | A1 * | 9/2011 | Hancock ............... F03D 1/0675 416/1 |
| 2012/0141271 | A1 | 6/2012 | Southwick |
| 2014/0271192 | A1 | 9/2014 | Brooks et al. |
| 2018/0058424 | A1 * | 3/2018 | Egedal .................. F03D 7/0228 |
| 2019/0186463 | A1 * | 6/2019 | Akay .................... F03D 7/0276 |
| 2019/0234376 | A1 * | 8/2019 | Akay .................... F03D 1/0683 |

FOREIGN PATENT DOCUMENTS

| | | |
|---|---|---|
| CN | 102996331 A | 3/2013 |
| CN | 110761940 A | 2/2020 |
| EP | 2778397 A1 | 9/2014 |
| KR | 101434469 B1 | 8/2014 |
| WO | 02051730 A2 | 7/2002 |
| WO | WO 02051730 A2 | 7/2002 |
| WO | 2010023278 A2 | 3/2010 |
| WO | WO2010023278 (A2) | 3/2010 |
| WO | 2017025352 A1 | 2/2017 |
| WO | WO 2017025352 A1 | 2/2017 |

OTHER PUBLICATIONS

International Search Report dated Oct. 9, 2018 for Application No. 18165844.4.
International Search Report & Written Opinion dated Mar. 23, 2018 for Application No. PCT/EP2017/080622.

* cited by examiner

PRESSURE SUPPLY SYSTEM FOR A PNEUMATICALLY ACTIVATABLE AERODYNAMIC DEVICE OF A ROTOR BLADE OF A WIND TURBINE

CROSS-REFERENCE TO RELATED APPLICATIONS

This application claims priority to PCT Application No. PCT/EP2017/080622, having a filing date of Nov. 28, 2017, which is based on German Application No. 10 2017 203 684.2, having a filing date of Mar. 7, 2017, the entire contents both of which are hereby incorporated by reference.

FIELD OF TECHNOLOGY

The following relates to a wind turbine with a rotor blade, wherein the wind turbine comprises a pressure supply system for controlling a pneumatically activatable aerodynamic device of the rotor blade.

BACKGROUND

Aerodynamic devices such as flaps, slats or spoilers are a common means to influence the aerodynamic properties of a wind turbine rotor blade. These devices are often used for selectively changing the aerodynamic properties such as the lift or the drag of the rotor blade under certain operational conditions of the wind turbine. It may, for example, be desired that the lift of the rotor blade is as high as possible for wind speeds below the rated wind speed of the wind turbine, but reduced for wind speeds above the rated wind speed. In this context, the rated wind speed of the wind turbine is referred to as the wind speed at which the wind turbine reaches its nominal output tower. For modern industrial wind turbines the rated wind speed is oftentimes between eight and twelve meters per second.

These aerodynamic devices may work passively. This means that the aerodynamic device does not change its configuration.

These aerodynamic devices may also work semi-passively. This means that no actuation means are used for inducing a change from a first configuration of the aerodynamic device into a second configuration of the aerodynamic device. Instead, through careful design of the aerodynamic device, it is achieved that if a pre-determined value of a chosen parameter, such as a pressure acting in a certain direction on the aerodynamic device, is reached or exceeded, the change of configuration occurs. Typically, the semi-passively working aerodynamic device comprises resilient means which ensure a change of configuration of the aerodynamic device back from the second into the first configuration if pre-determined conditions are met.

Aerodynamic devices may alternatively also work actively. This means that certain actuation means are used for inducing a change from a first configuration of the aerodynamic device into a second configuration of the aerodynamic device. These actuation means may e.g. work mechanically, electrically, hydraulically or pneumatically. The difference between actively and semi-passively working aerodynamic devices is that the former ones need an external stimulus for changing its configuration induced e.g. by a control unit and "transmitted" mechanically, electrically, hydraulically or pneumatically to the aerodynamic device, wherein the latter ones change its configuration without any externally controlled stimulus.

One advantage of actively working, or simply "active" aerodynamic devices is that they are more versatile with regard to the changes of configuration of the aerodynamic device which can be realized.

SUMMARY

An aspect relates to pneumatically activatable aerodynamic devices of a wind turbine rotor blade. The following seeks to disclose means for controlling the activatable aerodynamic devices and seeks to specifically describe how such means could be concretely designed.

According to embodiments of the invention, there is provided a wind turbine with a rotor blade, wherein the rotor blade comprises a pneumatically activatable aerodynamic device and the wind turbine comprises a pressure supply system for controlling the activatable aerodynamic device. The pressure supply system comprises a pressurized air supply system, a pressurized air transmission system with pressure lines for transmitting the supplied pressurized air from the pressurized air supply system to the aerodynamic device, and at least one pneumatic actuator for activating the aerodynamic device.

The concept of such a pressure supply system is specifically adapted to the demands and requirements of a wind turbine. This includes, for example, a very high reliability and a high degree of robustness of the system, as this is usually required for any system being implemented in a wind turbine.

By the term "wind turbine", a wind turbine for generating electricity is understood.

Compared to semi-passively working aerodynamic devices, the present aerodynamic device is activatable by a suitable mechanism. The embodiments concentration pneumatic activation of the aerodynamic device. This means that the aerodynamic device is movable from a first configuration to a second configuration by using a gas of a certain pressure. The gas can simply be air but may also comprise different chemical elements. The used wording "pressurized air supply system" and "pressurized air transmission system" shall in the context of this patent application only hint at a preferred use of air as the used gas but shall not limit embodiments of the invention and the scope of protection of the claims to the use of air. Instead, all sorts of gases are encompassed by embodiments of the present invention and the present claims.

The term "pressurized" air comprises air with a pressure above atmospheric pressure, but it also comprises air with a lower pressure than atmospheric pressure. Thus, embodiments of the invention in its broadest scope comprises both positive and negative pressure relative to the atmospheric pressure. Descriptively speaking, embodiments of the present invention is applicable both to overpressure as well as to low pressure.

The pressurized air is supplied by the pressurized air supply system. Subsequently, the pressurized air is transmitted by the pressurized air transmission system from the location where it is supplied, namely the pressurized air supply system, to the location where it is needed, namely at the aerodynamic device. The pressurized air transmission system comprises pressure lines, which can for example be tubes or pipes or similar devices.

Finally, the pressure supply system comprises the pneumatic actuator which is able and destined to selectively activate the aerodynamic device. To give examples, the pneumatic actuator may be realized as a (pressure) hose or a cavity or any other inflatable device. A common feature for a suitable pneumatic actuator is that it comprises a changeable, or variable, volume. In other words, the first configuration of the aerodynamic device may correlate to a deflated state of the actuator and the second configuration of the aerodynamic device may correlate to an inflated state of the actuator or vice versa.

In embodiments of the invention, the wind turbine comprises a plurality of rotor blades, three rotor blades, and the wind turbine comprises one common pressurized air supply system for all rotor blades.

An advantage of providing one common pressurized air supply system is rationalization and efficiency of the system. As the pressurized air as such can well be used for all present rotor blades of the wind turbine, it is advantageous to provide one single apparatus for supplying the pressurized air.

This common pressurized air supply system may advantageously be located in the hub of the wind turbine. The placement of the pressurized air supply system in the hub is beneficial as this represents a central location for supplying and distributing the pressurized air to the individual rotor blades.

As an alternative, the one common pressurized air supply system may also be located in other parts of the wind turbine, such as for example the nacelle. The placement of the pressurized air supply system in the nacelle might be preferred if there is only little space left in the hub or if it is undesired to place the pressurized air supply system in a continuously rotating component of the wind turbine (at least during operation of the wind turbine) such as the hub represents.

In the case that there is one common pressurized air supply system serving a plurality of rotor blades, a choice needs to be made whether the individual rotor blades are supplied with the same amount of pressurized air at the same time or whether the individual blades shall be supplied independently and separately from each other. The individual control and supply of the rotor blades by pressurized air might be preferable as then more versatility and control of the system can be ensured. In order to realize such a individual control of the rotor blades, individual valves are proposed at each pressure line heading from the common pressurized air supply system into the rotor blades.

In embodiments of the invention, the wind turbine comprises individual pressurized air supply systems, one for each rotor blade.

This has the advantage that the individual pressurized air supply systems can be configured smaller. Furthermore, if one pressurized air supply system fails, only one rotor blade is concerned with the failure. Such a failure represents of course an extraordinary event, but is nevertheless possible.

In the case that there are individual pressurized air supply systems for each rotor blade, one position where these individual pressurized air supply systems could be located is again the hub of the wind turbine. However, in this case also the root sections of the individual rotor blades might be an advantageous choice. The advantage of placing the pressurized air supply systems in the respective root sections is that no pressure lines are needed then in order to provide a connection across the pitch bearing of the rotor blade.

Furthermore note that the individual pressurized air supply systems could even be located further outboard in the rotor blade instead of being located in the inboard section such as the root section. An advantage of a placement of the pressurized air supply system further outboard could arise if the aerodynamic device itself is also located further outboard in the rotor blade. Then, the length of the pressurized air transmission system could be minimized by placing the pressurized air supply system close to the position where it actually needed.

Note that not only a reduced distance to be covered is advantageous in this scenario (which is, for example, important in the context of any exposure of the system to lightning strikes), but a reduced distance to be covered for the pressure lines is also advantageous in terms of reaction time of the system. Note that the closer the pressurized air supply system is with regard to the pneumatic actuator, the shorter the response time regarding changes in the pressure of the gas is.

The aerodynamic device may advantageously be realized as a flap, as a slat or as a spoiler. A flap is oftentimes located in the trailing edge section of the rotor blade. Contrary to a flap, a slat is defined as being located at the leading-edge section of the rotor blade. Oftentimes, a slat is separated from the main body of the rotor blade by a suitable gap, i.e. a suitable slot. Furthermore, a spoiler is typically something which is firmly attached and connected with the surface of the main body of the rotor blade but may change its profile if it is combined with a pneumatic actuator. One example of a spoiler is a Gurney flap, which is oftentimes mounted to the pressure side at the trailing edge section of the rotor blade. Another example of a spoiler is an element which is mounted upstream of the trailing edge section at the suction side of the rotor blade and which is able to induce stall of the airflow flowing from the leading-edge section to the trailing edge section of the rotor blade.

With regard to the alignment and the positioning of the pressure lines, one option is to align at least a part of the pressure lines along the trailing edge of the rotor blade. As in the case of a sharp trailing edge the region inside the rotor blade in the trailing edge section is oftentimes quite sensitive and the rotor blade may even be filled with some material in the case of a sharp trailing edge, a placement of the pressure lines outside, i.e. on the surface on the outer surface of the rotor blade, could also be beneficial.

As an alternative or in combination with the foregoing, the pressure lines could also be arranged and aligned along the shear web of the rotor blade. The shear web normally represents a supporting element between the pressure side shell and the suction side shell and is often located between 20% and 80% chord length. Thus, in this case the pressure lines are located in a central portion of the rotor blade and also at a very stable and stiff part of the blade.

In embodiments of the invention, the wind turbine further comprises at least one pressure reservoir for storing the supplied pressurized air.

Such a pressure reservoir has the advantage that pressurized air does not need to be supplied "on demand", but could be stored in an appropriate receptacle such as a container or a case. The provision of a pressure reservoir could be advantageous if the pressure reservoir is closer to the pneumatic actuator as the pressurized air supply system. The advantage would be that the response time for a pressure change in the actuator can be reduced.

In embodiments of the invention, the wind turbine further comprises at least one vacuum reservoir for storing air with a pressure below atmospheric pressure.

As it has been mentioned already, embodiments of the invention not only comprise the use of pressurized air comprising an overpressure compared to the atmospheric pressure, but also comprises the use low pressure air, involving "sucking air out" of the pneumatic actuator.

Likewise, this could be carried out "on demand" by the pressurized air supply system, but it is also an option to provide a vacuum reservoir for storing air with low pressure. Like for the placement of the pressure reservoir, also the vacuum reservoir could be located closer to the pneumatic actuator than the pressurized air supply system in order to realize short response times for actuation of the aerodynamic device.

In embodiments of the invention, the actuator comprises an inlet port at which the pressurized air flows into the actuator.

The inlet port could for example be located in the radially inward section of the actuator, given the fact that the actuator is a length wisely extended object. The inlet port could also be equipped with another valve for controlling and for selectively providing the actuator with pressurized air from the pressurized air supply system.

As an option, the actuator could also comprise an exhaust port at which the pressurized air flows out of the actuator.

This could be advantageous in case of a desired rapid discharge of the pressurized air being present in the pneumatic actuator. If there is no exhaust port in the actuator, the overpressure within the actuator would need certain time to assimilate with the atmospheric pressure.

In embodiments of the invention, the pressure supply system further comprises a safety relief valve, which can be pneumatically activated, for enabling a discharge of the pressurized air from the actuator in the event of overloading the wind turbine.

Such a safety relief valve could for example be triggered or activated if the pressure within the actuator reaches or exceeds a pre-determined value. Then, the safety relief valve would open and discharge the pressurized air which is present within the actuator, such as the inflatable hose or the inflatable cavity.

In embodiments of the invention, the pressure supply system further comprises air conditioning elements, such as filters and/or dehumidifiers, for minimizing the accumulation of dirt, oil and/or humidity within the pressure lines of the pressure supply system.

These types of elements are in principal known from other devices and apparatuses with air transmission systems, but should particularly be considered in the present case of a pressure supply system for a wind turbine rotor blade. It is noted that for many wind turbines, but in particular for offshore wind turbines and onshore wind turbines which are difficult to reach, servicing the wind turbine is extremely costly. Thus, any measure to avoid or minimize the accumulation of dirt, oil or other undesired components is appreciated.

In embodiments of the invention, the aerodynamic device is located in the outboard part of the rotor blade.

The rotor blade which is mounted on a hub of a wind turbine can be subdivided into an inboard part and an outboard part. The inboard part corresponds to the part which is comprised by the root section of the rotor blade, while the tip section of the rotor blade belongs to the outboard part. Many aerodynamic devices of a wind turbine rotor blade are positioned at the outboard part as there the wind speeds which are experienced by the rotor blades are normally higher and the impact on lift and load of the rotor blade is often increased.

Therefore, such a pressure supply system as presented in embodiments of the invention is highly useful and advantageous especially for aerodynamic devices being mounted in the outboard part of the rotor blade.

In another embodiment of the invention, the pressure reservoir is located close to the actuator, in particular in a distance which is less than 10% of the length of the rotor blade.

This has the advantage that the response time is short. It should, however, be kept in mind that the provision of the pressure reservoir far out in the rotor blade may involve an increase in the loads and may require a specifically reinforced section of the rotor blade.

One option is to place the pressure and/or vacuum reservoir close to the web of the rotor blade. This has the advantage that the reservoir is located close to the neutral axis of the rotor blade. Thus, the impact of a bending or twisting movement of the rotor blade on the reservoir is reduced.

In the case that the rotor blade has a separate tip part, such as a tip extension, another option would be to place the pressure and/or vacuum reservoir in the tip part. This has the advantage that access to the reservoir is facilitated. A placement of the reservoir(s) in the tip part normally ensures a relatively close location with regard to the actuator, as the aerodynamic device with the actuator is usually also placed in the outboard part of the rotor blade.

BRIEF DESCRIPTION

Some of the embodiments will be described in detail, with references to the following Figures, wherein like designations denote like members, wherein.

DETAILED DESCRIPTION

Figure 1:
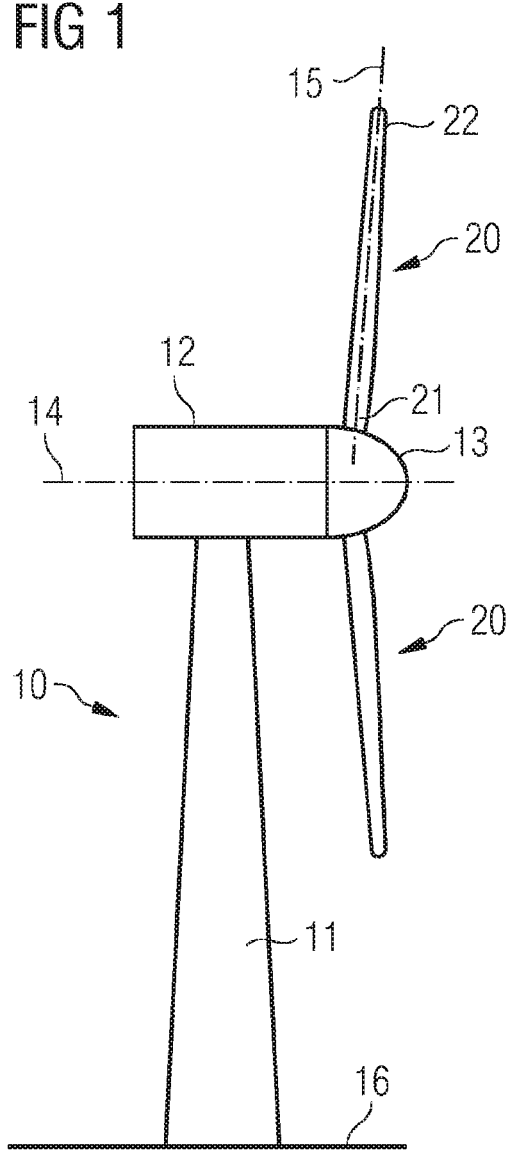
FIG. 1 shows a wind turbine.

FIG. 1 shows a conventional wind turbine 10 for generating electricity. The wind turbine 10 comprises a tower 11 which is mounted on the ground 16 by one end. At the other end of the tower 11, there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a substantially horizontal rotor axis 14 (including a small tilting angle of a few degrees). The hub 13 is often described as being a part of the rotor, wherein the rotor is capable to transfer the rotational energy to the generator.

The hub 13 is the part at which the rotor blades 20 are mounted. The rotor blade 20 is usually mounted pivotable to the hub 13. In other words, the rotor blades 20 can be pitched about pitch axes 15, respectively. This improves the control of the wind turbine and in particular of the rotor blades by the possibility to modify the direction at which the wind is impinging on the rotor blades 20. Each rotor blade 20 is mounted to the hub 13 at its root section 21. The root section 21 is opposed to the tip section 22 of the rotor blade. Note that in the example as shown in FIG. 1, only two rotor blades 20 are depicted. However, most of the wind turbines nowadays comprise three rotor blades.

Figure 2:
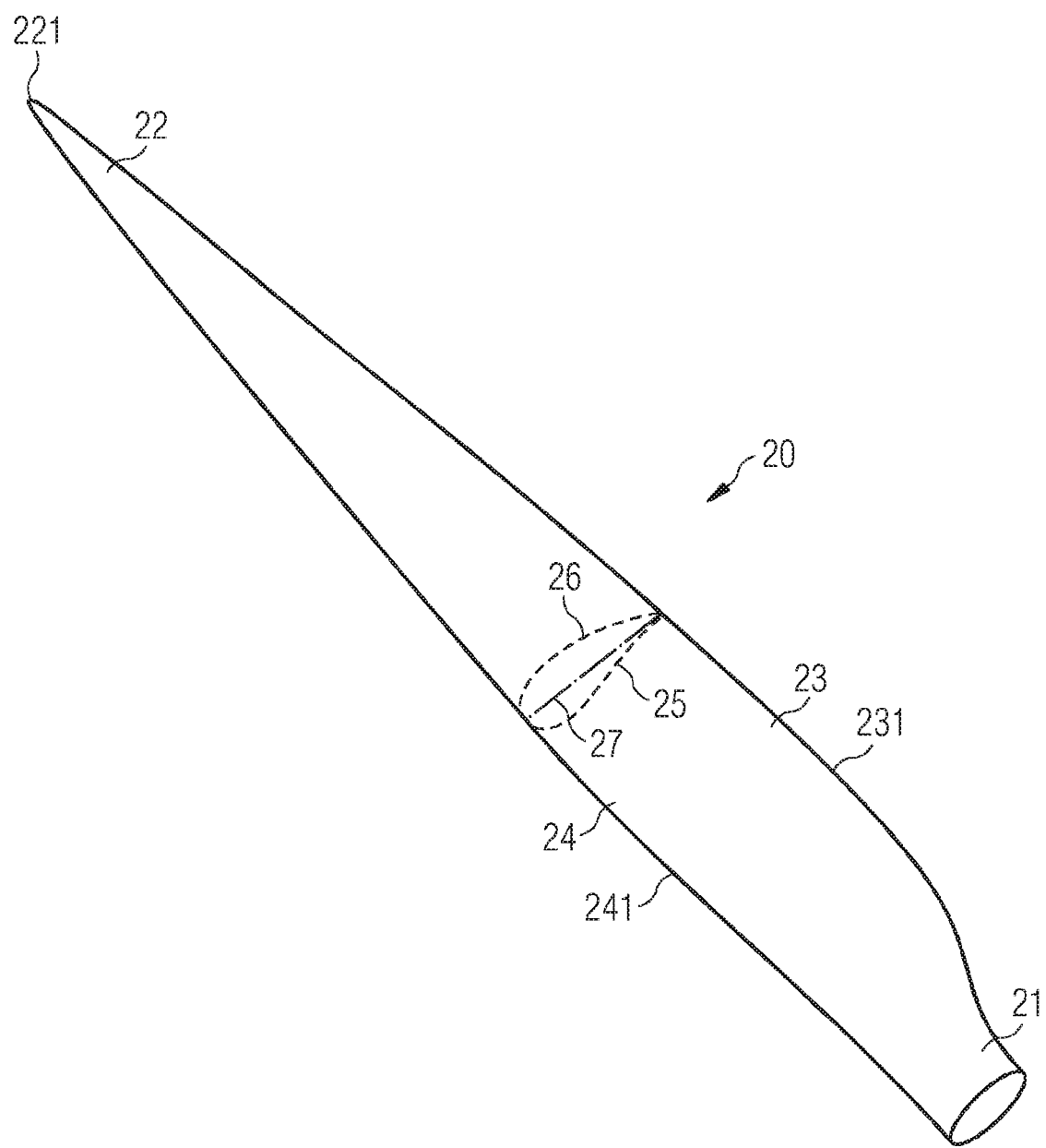
FIG. 2 shows a rotor blade of a wind turbine.

FIG. 2 shows such a rotor blade 20 of a wind turbine comprising a root section 21 and a tip section 22. Both sections, the root section 21 and the tip section 22, comprise up to ten percent in the spanwise direction of the rotor blade. The radially outmost point of the rotor blade is the so-called tip 221 of the rotor blade 20. The rotor blade 20 furthermore comprises a trailing edge 231 and a leading edge 241. The leading edge 241 typically has a curved and rounded shape, while the trailing edge 231 typically has a sharp or blunt edge. The section around the leading edge 241 is referred to as the leading edge section 24; likewise, the section around the trailing edge 231 is referred to as the trailing edge section 23.

The straight line between the trailing edge 23 and the leading edge 24 is called the chord line 27. The chord line 27 divides the airfoil into a pressure side 25 and a suction side 26. One of the airfoils is exemplarily shown in FIG. 2. It is to be understood that the rotor blade 20 comprises a plurality of airfoils—one next to the other—from the root section 21 to the tip section 22. These gradually changing airfoils cause the gradual change of the shape of the rotor blade. The airfoil has a lift generating shape in most of the sections of the rotor blade.

Figure 3:
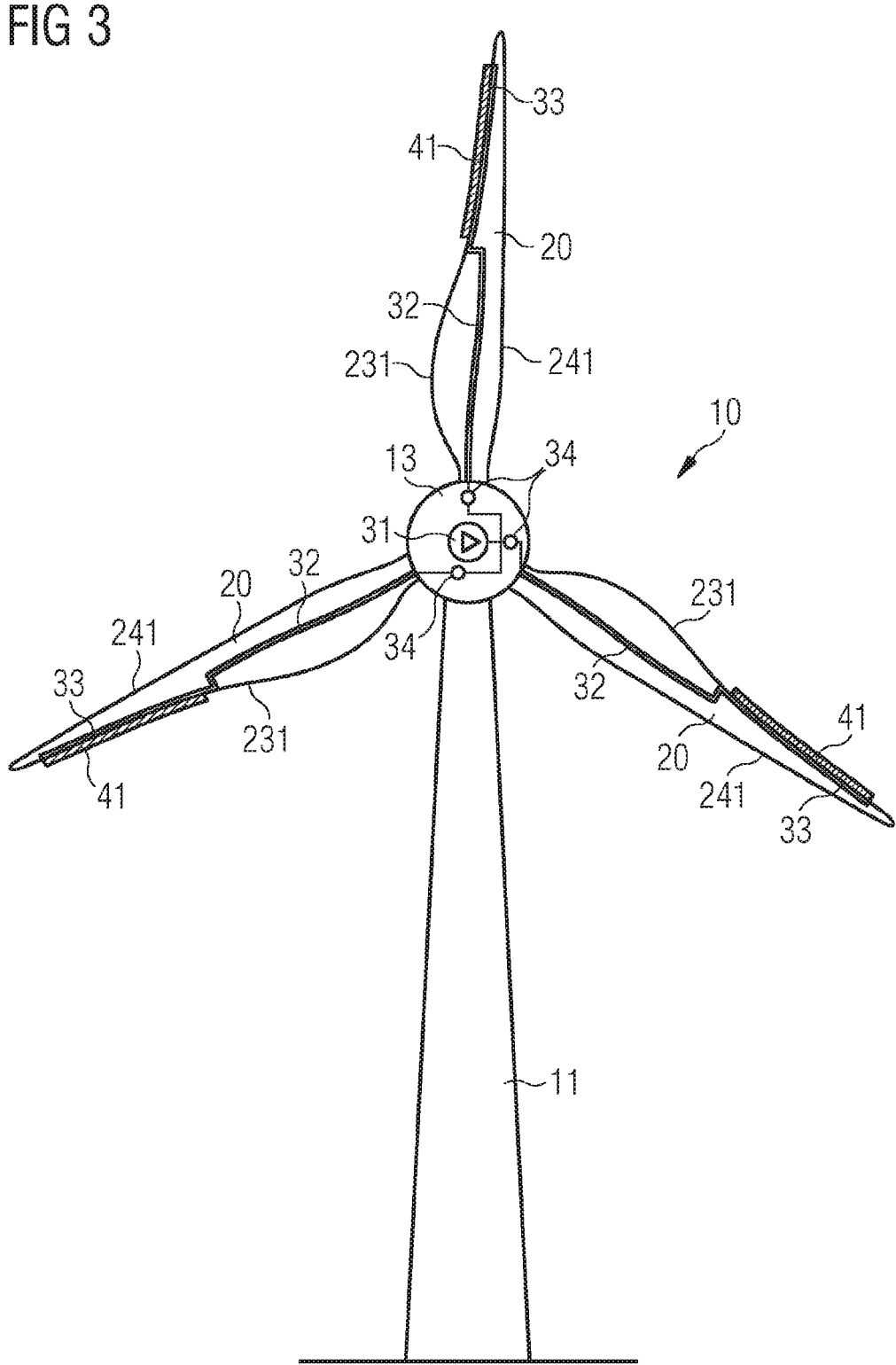
FIG. 3 shows a wind turbine with a pressure supply system.

FIG. 3 shows a wind turbine 10 with a pressure supply system according to embodiments of the invention. The wind turbine 10 is seen in a front view. Therefore, the nacelle 12 is hidden behind the hub 13 and is not visible in this perspective. Apart of that, the wind turbine 10 comprises three rotor blades 20, wherein each rotor blade 20 comprises an aerodynamic device 41 which is in the example of FIG. 3 configured as a trailing edge flap. The trailing edge flap is mounted at the trailing edge 231 of the rotor blades 20 and extends along the trailing edge 231 in the outboard part of the respective rotor blades.

The pressure supply system comprises one common pressurized air supply system 31 which is located centrally in the hub 13. The pressurized air supply system 31 provides pressurized air to each of the three rotor blades. Therefore, a pressurized air transmission system 32 in the form of pressure lines extend from the pressurized air supply system 31 to the individual rotor blades. The transmission of pressurized air through the pressure lines is controllable via three individual valves, one for each rotor blade 20. After entering the rotor blades via the root section, the pressure lines run along the shear webs, which are not visible in FIG. 3, to the aerodynamic devices 41. Each pressurized air transmission system 32 enters a pneumatic actuator 33 at an inlet port and supplies the pneumatic actuator 33 with pressurized air.

FIG. 4 illustrates again the variant of one common pressurized air supply system 31 being centrally located in the hub 13 of the wind turbine. In other words, there is one single input but multiple outputs of pressurized air.

Figure 4:
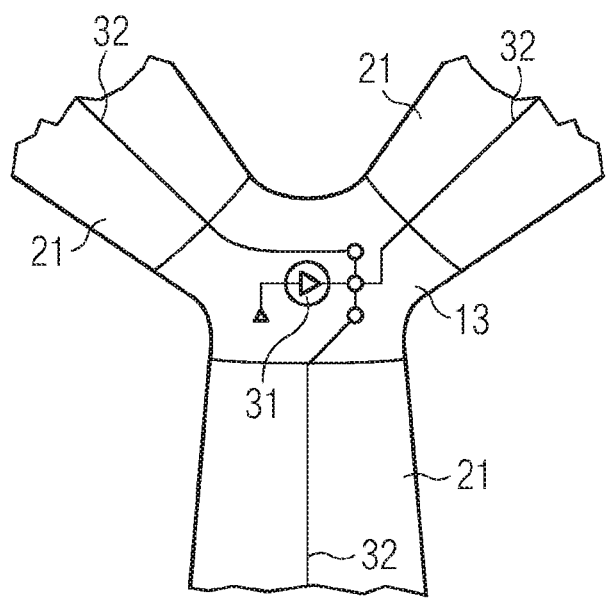
FIG. 4 shows a pressure supply system with one common pressurized air supply system for all rotor blades.
Figure 5:
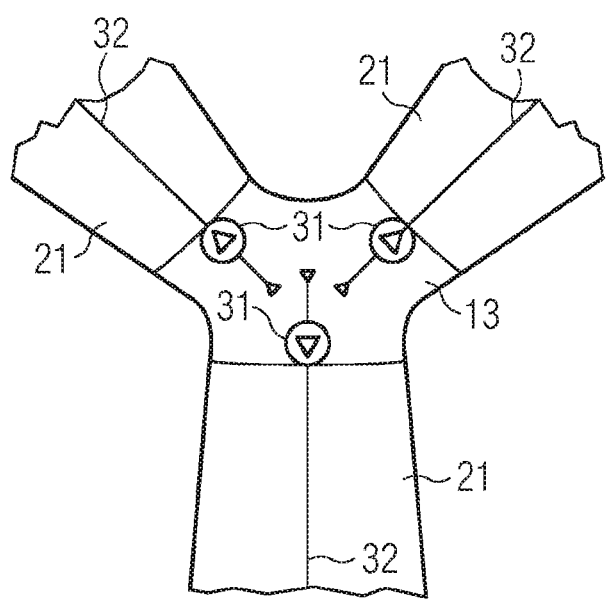
FIG. 5 shows individual pressurized air supply systems for each rotor blade.

In contrast to the variant shown in FIG. 4, FIG. 5 shows an alternative realization, where there are multiple input sources and multiple output means. Concretely, one individual pressurized air supply system 31 is provided for each rotor blade and supplies one individual rotor blade with pressurized air. In the example shown in FIG. 5, the pressurized air supply systems 31 are located in the hub 13, but could alternatively also be located in the rotor blade, such as in the root section 21 of the rotor blades.

Figure 6:
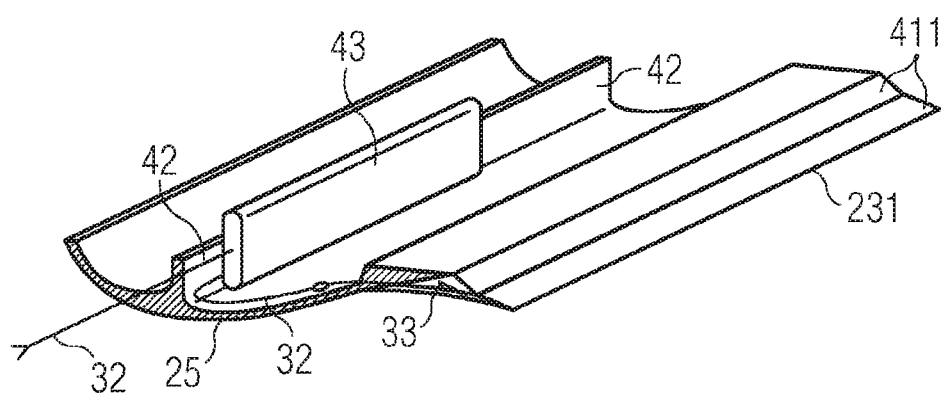
FIG. 6 shows the alignment of the pressure lines along the shear web and the provision of a pressure reservoir in a rotor blade.

FIG. 6 is a section cut at a rotor blade of a wind turbine. It may also be described as showing the pressure side shell of such a rotor blade, or, to be more precise, a part of it. The rotor blade comprises a shear web 42 which is located at approximately 40% chordal length as measured from the leading edge of the rotor blade. It can be seen that the pressurized air transmission system which brings and supplies air from the pressurized air supply system to the aerodynamic device runs along the shear web 42 until it reaches a pressure reservoir 43. The pressure reservoir is aligned and attached to the shear web 42. From the pressure reservoir 43 a pressurized air transmission system, concretely a pressure line, is running directly to the trailing edge of the rotor blade and exits the inner cavity of the rotor blade close to the trailing edge of the rotor blade. There, it is aligned at the pressure side 25 of the rotor blade until it reaches the pneumatic actuator 33.

The pneumatic actuator 33 is able to move the aerodynamic device which is realized as a two-part flap 411 and the pneumatic actuator is able to move the flap 411 into the desired orientation. For example, a change of the orientation of the flap 411 downwards, i.e. further towards the pressure side 25 may considerably change the lift and the load of the rotor blade.

Figure 7:
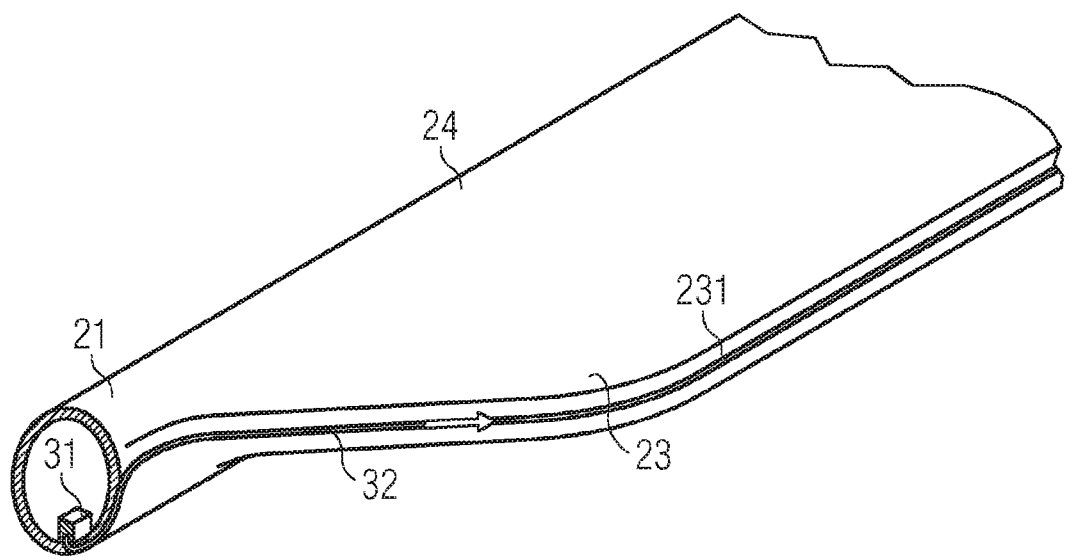
FIG. 7 shows the alignment of the pressure lines along the trailing edge of the rotor blade.

As an alternative, FIG. 7 shows the alignment of the pressure lines not along the shear web but along the blunt and thick trailing edge 231 of the rotor blade. Here, the pressure lines 32 exit the blade already from the beginning on. Also note that in case of the embodiment as illustrated in FIG. 7, the pressurized air supply system 31 is located in the root section 21 of the rotor blade.

Figure 8:
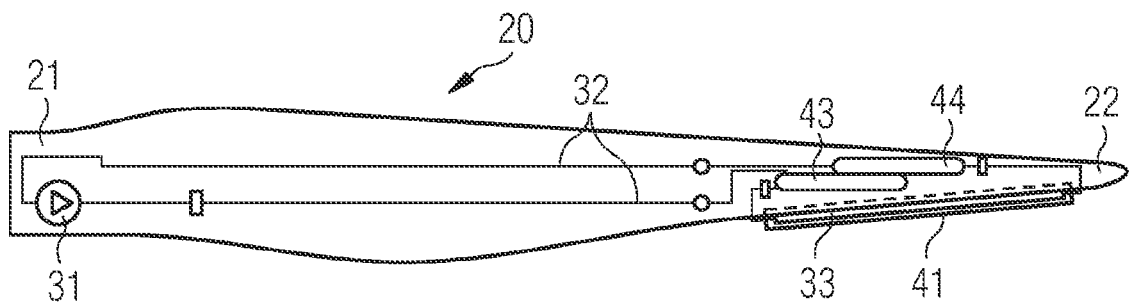
FIG. 8 shows the provision of a pressure reservoir and a vacuum reservoir in the outboard part of the rotor blade.

FIG. 8 shows a complete view on a rotor blade 20 which comprises a pressure supply system. The pressure supply system comprises a pressurized air supply system 31 which is located in the root section 21 of the rotor blade 20. From the pressurized air supply system 31 a pressurized air transmission system in the form of pressure lines lead directly to a pressure reservoir 43. The pressure reservoir 43 is located in the outboard section of the rotor blade 20, namely close to the aerodynamic device 41 with the pneumatic actuator 33 which needs to be supplied with pressurized air. From the pressure reservoir 43, there reaches another pressure line to the pneumatic actuator 33. The pneumatic actuator 33 comprises an inlet port where the pressure lines reach the pneumatic actuator 33. Furthermore, the pneumatic actuator 33 also has an exhaust port which is connected with a vacuum reservoir 44. Also, the vacuum reservoir 44 is located in the outboard part of the rotor blade.

Figure 9:
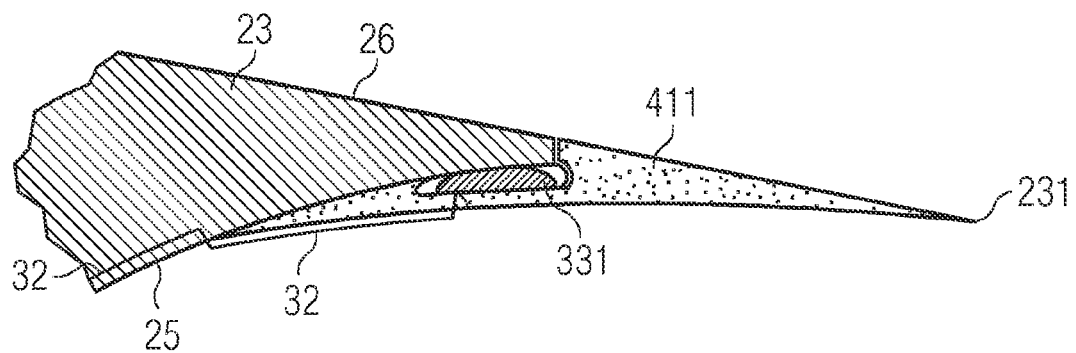
FIG. 9 shows a flap which is activatable by a hose.
Figure 10:
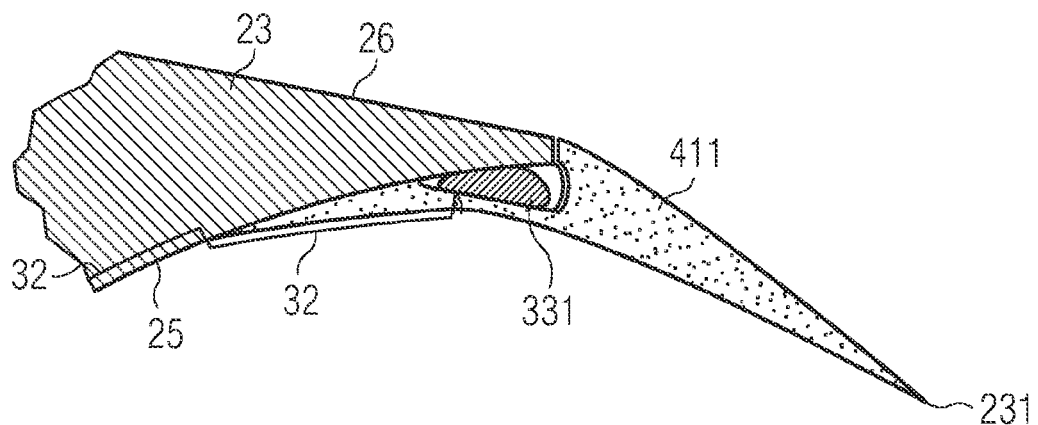
FIG. 10 shows the same flap as in FIG. 9, but with an inflated hose.

Finally, FIGS. 9 and 10 show an example of a flap 411 which is an example of an aerodynamic device. The flap 411 is a trailing edge flap which is arranged at the trailing edge section 23 of the rotor blade. It comprises one part which is directly connected to the trailing edge section 23 of the rotor blade. The flap 411 also comprises another section by which the flap 411 is attached to the pressure side 25 of the rotor blade.

The flap 411 comprises a cavity where a hose 331 is provided. The hose 331 almost fills the entire cavity. The hose 331 can be filled or emptied by air by means of a pressurized air transmission system which extends at the exterior of the rotor blade first and subsequently enters the cavity of the rotor blade. The actuator may also comprise an exhaust port, however this has been omitted in the cross-sectional view as shown in FIGS. 9 and 10 for sake of simplicity.

The difference between the first configuration as illustrated in FIG. 9 and the second configuration as illustrated in FIG. 10 is the volume of the hose 331. In FIG. 9, the hose 331 is almost empty. In other words, it is deflated. No pressure is applied to the air which is present in the hose 331. Compared to that, in the second configuration as illustrated in FIG. 10, pressurized air has been pressed into the hose 331. Through careful design of the flap 411, the flap 411 changes its shape and its configuration when the hose 331 is inflated. In this case, the flap 411 bends downwards, i.e. towards the pressure side 25 of the rotor blade. This has the effect that the lift, and thus also the load of the rotor blade is changed. Note that FIGS. 9 and 10 only show one of many possible embodiments of such a pneumatic actuator.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A wind turbine with a rotor blade, wherein the rotor blade comprises a pneumatically activatable aerodynamic device and the wind turbine comprises a pressure supply system for controlling the pneumatically activatable aerodynamic device, wherein the pressure supply system includes a pressurized air transmission system with pressure lines for transmitting pressurized air to the aerodynamic device, and at least one pneumatic actuator for activating the aerodynamic device, wherein the pneumatically activatable aerodynamic device comprises a cavity, wherein the actuator comprises an inflatable hose arranged in the cavity, wherein the inflatable hose contacts the pressure side of the rotor blade, and wherein the activatable aerodynamic device bends toward the pressure side of the rotor blade when the inflatable hose is inflated.

2. The wind turbine according to claim 1, wherein the wind turbine comprises a plurality of rotor blades and the pressure supply system provides pressurized air for all rotor blades.

3. The wind turbine according to claim 2, wherein a portion of the pressure supply system is located in the hub of the wind turbine.

4. The wind turbine according to claim 2, wherein the individual rotor blades can be controlled independently from each other by separately controlled individual valves which control the transmission of the pressurized air to the respective actuators of the individual rotor blades.

5. The wind turbine according to claim 1, wherein the wind turbine comprises a plurality of rotor blades and the wind turbine comprises individual pressure supply systems for each rotor blade.

6. The wind turbine according to claim 5, wherein each of the individual pressure supply systems is located in the root section of the corresponding rotor blade.

7. The wind turbine according to claim 1, wherein the pressure lines are aligned along at least a portion of a trailing edge of the rotor blade.

8. The wind turbine according to claim 1, wherein the pressure lines are aligned along at least a portion of a shear web of the rotor blade.

9. The wind turbine according to claim 1, wherein the wind turbine further comprises at least one pressure reservoir for storing pressurized air.

10. The wind turbine according to claim 9, wherein the pressure reservoir is located close to the at least one actuator, a distance which is less than ten per cent of the length of the rotor blade.

11. The wind turbine according to claim 1, wherein the wind turbine further comprises at least one vacuum reservoir for storing air with a pressure below atmospheric pressure.

12. The wind turbine according to claim 1, wherein the inflatable hose substantially fills the cavity of the pneumatically activatable aerodynamic device.

13. The wind turbine according to claim 1, wherein the actuator comprises an inlet port at which pressurized air flows into the actuator.

14. The wind turbine according to claim 1, wherein the actuator comprises an exhaust port at which pressurized air flows out of the actuator.

15. The wind turbine according to claim 1, wherein the pressure supply system further comprises a safety relief valve, which can be pneumatically activated, for enabling a discharge of the pressurized air from the actuator.

16. The wind turbine according to claim 1, wherein the pneumatically activatable aerodynamic device is a flap.

17. The wind turbine according to claim 16, wherein the flap attaches to the pressure side of the rotor blade.

18. The wind turbine according to claim 16, wherein the flap attaches to a trailing edge section of the rotor blade.

19. The wind turbine according to claim 16, wherein the flap attaches to both the pressure side of the rotor blade and a trailing edge section of the rotor blade.

* * * * *